US012718278B2

(12) United States Patent
Sun et al.

(10) Patent No.: US 12,718,278 B2
(45) Date of Patent: Aug. 25, 2026

(54) METHOD, MEDIUM, AND SYSTEM FOR MITIGATING DISPLAY OF NON-COMPLIANT INFORMATION

(71) Applicant: Walmart Apollo, LLC, Bentonville, AR (US)

(72) Inventors: Ming Sun, Hoboken, NJ (US); Weiqi Tong, New York, NY (US); Nidhin Pattaniyil, Philadelphia, PA (US); Antonio Khalil Moretti, New York, NY (US); Tanwir Zaman, Jersey City, NJ (US); Yiyi Huang, Weehawken, NJ (US); Guang Yang, Bellevue, WA (US); Zheng Yan, Short Hills, NJ (US)

(73) Assignee: WALMART APOLLO, LLC, Bentonville, AR (US)

( * ) Notice: Subject to any disclaimer, the term of this patent is extended or adjusted under 35 U.S.C. 154(b) by 162 days.

(21) Appl. No.: 18/903,663

(22) Filed: Oct. 1, 2024

(65) Prior Publication Data

US 2025/0022033 A1 Jan. 16, 2025

Related U.S. Application Data

(63) Continuation of application No. 17/496,676, filed on Oct. 7, 2021, now Pat. No. 12,106,350.

(51) Int. Cl.
*G06Q 30/0601* (2023.01)

(52) U.S. Cl.
CPC ................................ *G06Q 30/0627* (2013.01)

(58) Field of Classification Search
CPC ....................... G06Q 30/0627; G06Q 30/0629
See application file for complete search history.

(56) References Cited

U.S. PATENT DOCUMENTS 7,877,385 B2 1/2011 Craswell et al.
9,171,078 B2 10/2015 Imig et al.
(Continued)

FOREIGN PATENT DOCUMENTS

JP 2017069599 A * 4/2017 ........... G06V 30/413
WO WO-2019099987 A1 * 5/2019 ............. G06Q 10/00
WO WO-2021096677 A1 * 5/2021 ....... G06F 16/90332

OTHER PUBLICATIONS

Kannan, Anitha, et al. "Improving product classification using images." 2011 IEEE 11th International Conference on Data Mining. IEEE, 2011. (Year: 2011).*
(Continued)

*Primary Examiner* — Matthew E Zimmerman
(74) *Attorney, Agent, or Firm* — FOLEY & LARDNER LLP

(57) ABSTRACT

According to an embodiment of the present disclosure, a system is provided. The system includes a processor and a non-transitory computer-readable medium storing computing instructions. The instructions, when executed on the processor, perform: receiving user search queries and product items, the product items including metadata corresponding to product types, the product types comprising an error, and the error corresponding to one of the product items having a non-compliant product type; modifying the metadata corresponding to the product types based on a product type group to mitigate a computing system from displaying non-compliant material to a user; and in response to a product type of the product type group being the non-compliant product type, performing a computer vision prediction on an image of a product corresponding to the product type to detect a misclassification in the product type group. Other embodiments are disclosed.

20 Claims, 10 Drawing Sheets

(56) References Cited

U.S. PATENT DOCUMENTS

| | | | | |
|---|---|---|---|---|
| 9,286,548 | B2 * | 3/2016 | Kannan | G06F 18/241 |
| 9,785,717 | B1 * | 10/2017 | DeLuca | G06F 16/9535 |
| 9,996,590 | B2 * | 6/2018 | Wang | G06N 20/00 |
| 10,861,080 | B1 * | 12/2020 | Sanders | G06Q 30/0641 |
| 2015/0379601 | A1 * | 12/2015 | Ouimet | G06Q 30/0613 705/26.41 |
| 2017/0193009 | A1 * | 7/2017 | Rapantzikos | G06F 16/483 |
| 2018/0053069 | A1 * | 2/2018 | Kale | G06N 5/022 |
| 2018/0276726 | A1 * | 9/2018 | Siddiqui | G06Q 30/0603 |
| 2019/0228270 | A1 * | 7/2019 | Deluca | G06Q 10/40 |
| 2021/0125199 | A1 * | 4/2021 | Woodbeck | G06F 16/51 |

OTHER PUBLICATIONS

Mao, K., et al., "Item Tagging for Information Retrieval: A Tripartite Graph Neural Network Based Approach," arXiv:2008.11567v1 [cs.IR], 10 pgs. Aug. 26, 2020.

Noce, L., et al., "Query and Product Suggestion for Price Comparison Search Engines Based on Query-product Click-through Bipartite Graphs," Proceedingsof the 12th Int'l Conference on Web Information Systems and Technologies (WEBIST 2016), vol. 1, pp. 17-24 2016.

* cited by examiner

Universal Serial Bus
112
CD-Rom Drive
116
Hard Drive
114
Graphics Adapter
224
214
Disk Controller
204
Memory ROM/RAM
208
Network Adapter
220
System Bus
Other I/O Devices
222
Mouse Adapter
206
Mouse
110
Keyboard Adapter
226
Keyboard
104
CPU
210
Video Controller
202
Monitor
106

METHOD, MEDIUM, AND SYSTEM FOR MITIGATING DISPLAY OF NON-COMPLIANT INFORMATION

CROSS-REFERENCE TO RELATED APPLICATION

The present U.S. patent application is a continuation of U.S. patent application Ser. No. 17/496,676, titled "SYSTEMS AND METHODS FOR MITIGATING DISPLAY OF NON-COMPLIANT INFORMATION".

TECHNICAL FIELD

This disclosure relates generally to graphical user interfaces, and more particularly to systems and methods for mitigating display of non-compliant information.

BACKGROUND

Users commonly search for products with attributes that the users wish to view. These attributes commonly are associated with product types in a product catalog that are utilized to display information (e.g., products) to the user. Often, the accuracy and coverage of product types in the product catalog significantly affect the user's search experience. However, product types assigned manually or automatically by a computer system can sometimes be incorrect. In addition, the taxonomy of a product type and/or attribute may evolve over time. As such, a product catalog can include product types that are erroneous or outdated.

BRIEF DESCRIPTION OF THE DRAWINGS

To facilitate further description of the embodiments, the following drawings are provided in which.

Figure 1:
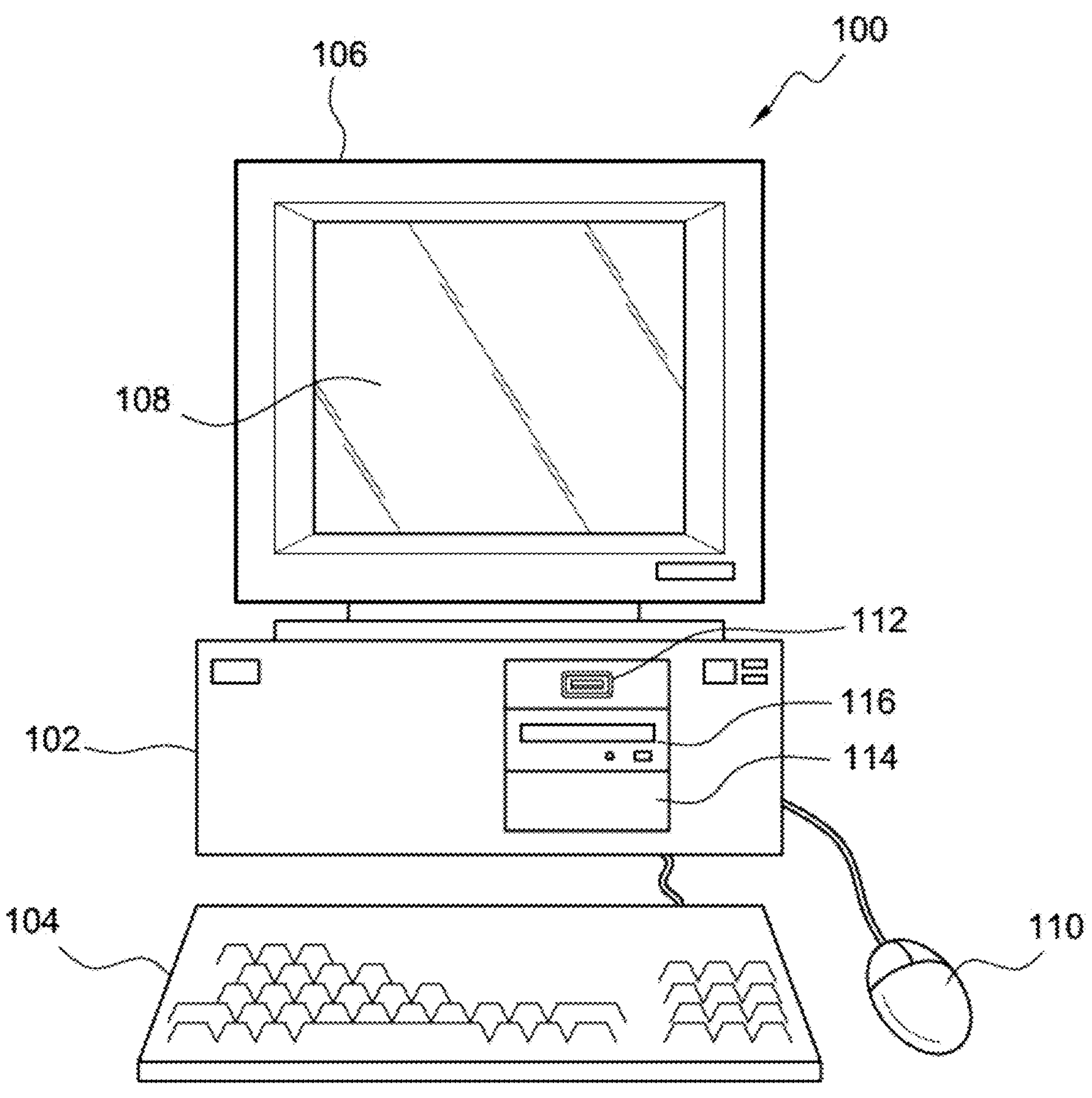
FIG. 1 illustrates a front elevational view of a computer system that is suitable for implementing various embodiments of the systems disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, “approximately” can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform: receiving user search queries and product items, the product items including metadata corresponding to product types; determining a data relationship between the user search queries and the product items based on a weighting factor, the data relationship including user search query nodes and product item nodes; determining a first vector representation for first ones of the product item nodes in the data relationship; determining a second vector representation for second ones of the product item nodes in the data relationship; grouping the first vector representation for first ones of the product item nodes and the second vector representation for second ones of the product item nodes into a product type group based on a proximity search; and modifying the metadata corresponding to the product types based on the product type group to mitigate a computing system from displaying non-compliant material to a user.

Various embodiments include a method. The method can be implemented via execution of computing instructions configured to run at one or more processors and configured to be stored at non-transitory computer-readable media. The method can comprise receiving user search queries and product items, the product items including metadata corresponding to product types; determining a data relationship between the user search queries and the product items based on a weighting factor, the data relationship including user search query nodes and product item nodes; determining a first vector representation for first ones of the product item nodes in the data relationship; determining a second vector representation for second ones of the product item nodes in the data relationship; grouping the first vector representation for first ones of the product item nodes and the second vector representation for second ones of the product item nodes into a product type group based on a proximity search; and modifying the metadata corresponding to the product types based on the product type group to mitigate a computing system from displaying non-compliant material to a user.

According to an example embodiment of the present disclosure, a system is provided. The system includes a processor and a non-transitory computer-readable medium storing computing instructions. The instructions, when executed on the processor, perform: receiving user search queries and product items, the product items including metadata corresponding to product types, the product types comprising an error, and the error corresponding to one of the product items having a non-compliant product type; modifying the metadata corresponding to the product types based on a product type group to mitigate a computing system from displaying non-compliant material to a user; and in response to a product type of the product type group being the non-compliant product type, performing a computer vision prediction on an image of a product corresponding to the product type to detect a misclassification in the product type group.

According to another embodiment of the present disclosure, a computer-implemented method for mitigating display of non-compliant information is provided. The computer-implemented method includes: receiving user search queries and product items, the product items including metadata corresponding to product types, the product types comprising an error, and the error corresponding to one of the product items having a non-compliant product type; determining a data relationship between the user search queries and the product items based on a weighting factor, the data relationship including user search query nodes and product item nodes; modifying the metadata corresponding to the product types based on a product type group to mitigate a computing system from displaying non-compliant material to a user; and in response to a product type of the product type group being the non-compliant product type, performing a computer vision prediction on an image of a product corresponding to the product type to detect a misclassification in the product type group.

According to an further embodiment of the present disclosure, a non-transitory computer-readable medium storing instructions for data management is provided. The instructions, upon execution by processors of a computing system, cause the computing system to perform at least one process including: receiving user search queries and product items, the product items including metadata corresponding to product types, the product types comprising an error, and the error corresponding to one of the product items having a non-compliant product type; determining a data relationship between the user search queries and the product items based on a weighting factor, the data relationship including user search query nodes and product item nodes; determining a first vector representation for first ones of the product item nodes in the data relationship; modifying the metadata corresponding to the product types based on a product type group to mitigate a computing system from displaying non-compliant material to a user; and in response to a product type of the product type group being the non-compliant product type, performing a computer vision prediction on an image of a product corresponding to the product type to detect a misclassification in the product type group.

Figure 2:
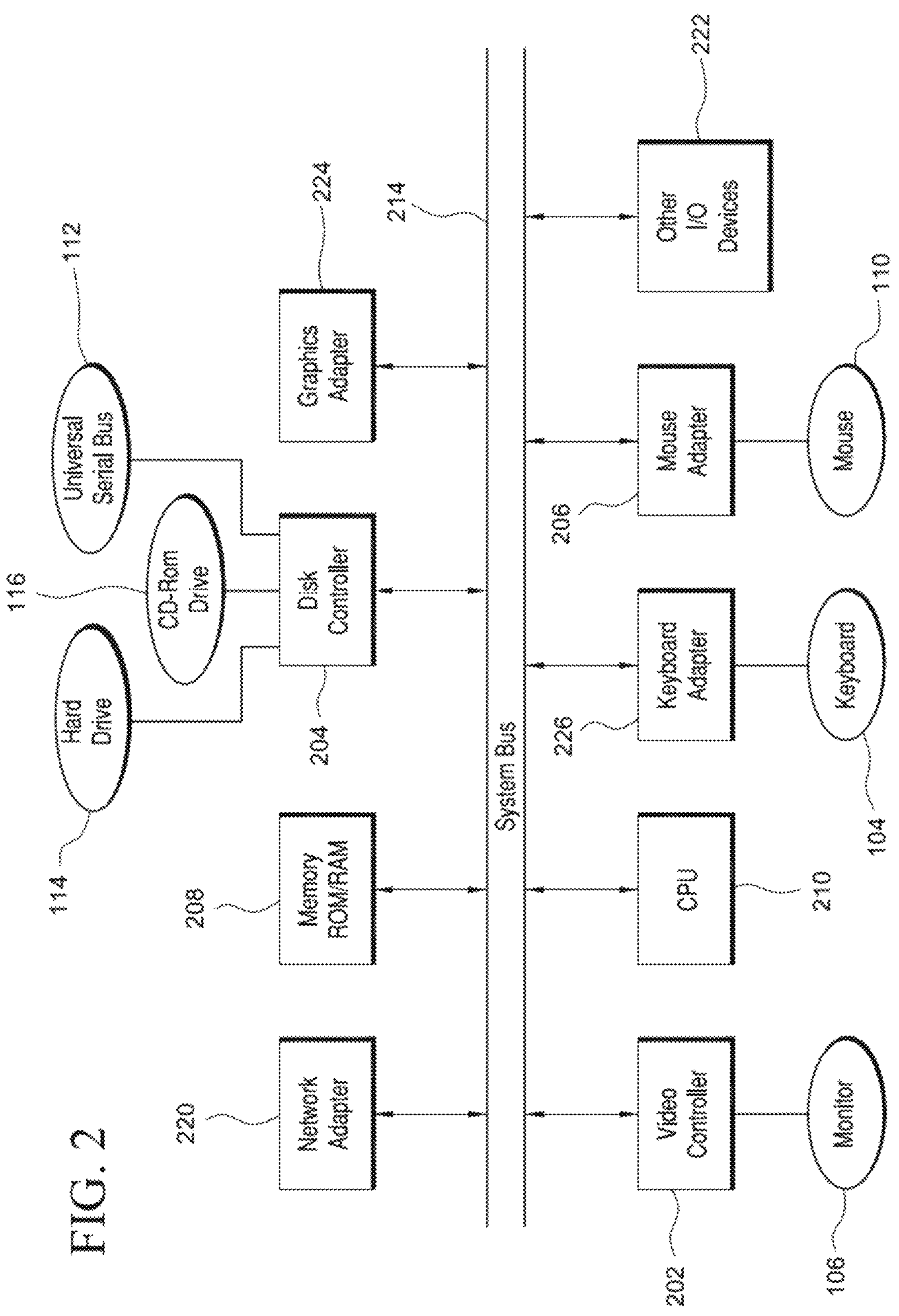
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module (s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
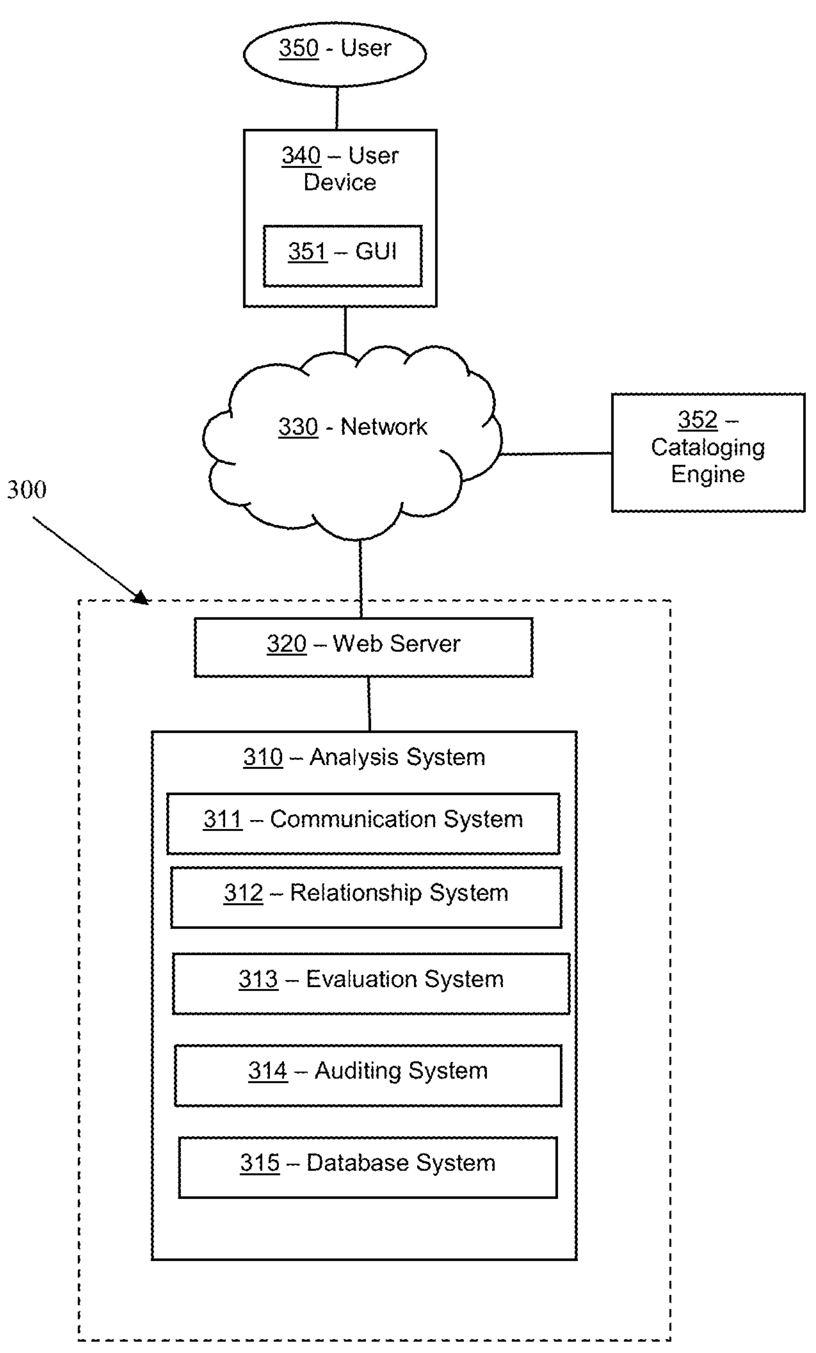
FIG. 3 illustrates a representative block diagram of a system, according to an embodiment.

Turning ahead in the drawings, FIG. 3 illustrates a block diagram of a system 300 that can be employed for determining and analyzing infrastructure components, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include an infrastructure analysis system 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Infrastructure analysis system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host infrastructure analysis system 310 and/or web server 320. Additional details regarding infrastructure analysis system 310 and/or web server 320 are described herein.

In some embodiments, web server 320 can be in data communication through a network 330 with one or more user devices, such as a user device 340. User device 340 can be part of system 300 or external to system 300. Network 330 can be the Internet or another suitable network. In some embodiments, user device 340 can be used by users, such as a user 350. In many embodiments, web server 320 can host one or more websites and/or mobile application servers. For example, web server 320 can host a website, or provide a server that interfaces with an application (e.g., a mobile application), on user device 340, which can allow users (e.g., 350) to interact with infrastructure components in an IT environment, in addition to other suitable activities. In a number of embodiments, web server 320 can interface with infrastructure analysis system 310 when a user (e.g., 350) is viewing infrastructure components in order to assist with the analysis of the infrastructure components.

In some embodiments, an internal network that is not open to the public can be used for communications between infrastructure analysis system 310 and web server 320 within system 300. Accordingly, in some embodiments, infrastructure analysis system 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, infrastructure analysis system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to infrastructure analysis system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of recommendation system 310 and/or web server 320. In a similar manner, the processors and/or the non-transitory computer-readable media can be local and/or remote to each other.

Meanwhile, in many embodiments, infrastructure analysis system 310 and/or web server 320 also can be configured to communicate with one or more databases, such as a database system 315. The one or more databases can include a product database that contains information about products, items, or SKUs (stock keeping units), for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, infrastructure analysis system 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, infrastructure analysis system 310 can include a communication system 311, a relationship system 312, an evaluation system 313, an auditing system 314, and/or database system 315. In many embodiments, the systems of infrastructure analysis system 310 can be modules of computing instructions (e.g., software modules) stored at non-transitory computer readable media that operate on one or more processors. In other embodiments, the systems of infrastructure analysis system 310 can be implemented in hardware. Infrastructure analysis system 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host infrastructure analysis system 310 and/or web server 320. Additional details regarding infrastructure analysis system 310 and the components thereof are described herein.

In many embodiments, system 300 can comprise graphical user interface ("GUI") 351. In the same or different embodiments, GUI 351 can be part of and/or displayed by user computers 340, 341, which also can be part of system 300. In some embodiments, GUI 351 can comprise text and/or graphics (image) based user interfaces. In the same or different embodiments, GUI 351 can comprise a heads up display ("HUD"). When GUI 351 comprises a HUD, GUI 351 can be projected onto a medium (e.g., glass, plastic, etc.), displayed in midair as a hologram, or displayed on a display (e.g., monitor 106 (FIG. 1)). In various embodiments, GUI 351 can be color, black and white, and/or greyscale. In many embodiments, GUI 351 can comprise an application running on a computer system, such as computer system 100 (FIG. 1), user computers 340. In the same or different embodiments, GUI 351 can comprise a website accessed through internet 320. In some embodiments, GUI 351 can comprise an eCommerce website. In these or other embodiments, GUI 351 can comprise an administrative (e.g., back end) GUI allowing an administrator to modify and/or change one or more settings in system 300. In the same or different embodiments, GUI 351 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, web server 320 can be in data communication through Network (e.g., Internet) 330 with user computers (e.g., 340). In certain embodiments, user computers 340 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, analysis system 310, and/or web server 320 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of analysis system 310, and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of analysis system 310, and/or web server 320. In a similar manner, the processing module(s) and the memory storage module(s) can be local and/or remote to each other.

In many embodiments, analysis system 310, and/or web server 320 can be configured to communicate with one or more user computers 340. In some embodiments, user computers 340 also can be referred to as customer computers. In some embodiments, analysis system 310, and/or web server 320 can communicate or interface (e.g., interact) with one or more customer computers (such as user computers 340) through a network or internet 330. Internet 330 can be an intranet that is not open to the public. In further embodiments, Internet 330 can be a mesh network of individual systems. Accordingly, in many embodiments, analysis system 310, and/or web server 320 (and/or the software used by such systems) can refer to a back end of system 300 operated by an operator and/or administrator of system 300, and user computers 340 (and/or the software used by such systems) can refer to a front end of system 300 used by one or more users 350, respectively. In some embodiments, users 350 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

In some embodiments, system 300 can receive information from a cataloging engine 352. In some embodiments, the cataloging engine 352 can comprise information about products, items, or SKUs (stock keeping units), for example, among other data as described herein. In the same or different embodiments, the cataloging engine 352 can comprise levels of an item taxonomy. In many embodiments, an item taxonomy can be configured to classify a catalogue of items based on properties of each item of the catalogue of items. In the same or different embodiments, properties of an item can comprise a title, a description, a price, a brand, a manufacturer, a color, a quantity, a volume, a weight, a material, a style, a pattern, a theme, a recommended use, a color, a fabric, etc. In some embodiments, an item taxonomy can comprise distinct levels of item classification. In further embodiments, distinct levels of item classification can narrow as the distinct levels go deeper into an item taxonomy. In various embodiments, distinct levels of item classification can comprise a super department, a department, a category, and/or a sub-category. In many embodiments, a department can be deeper in an item taxonomy than a super department. In the same or different embodiments, a category can be deeper in an item taxonomy than a department. In some embodiments, a sub-category can be deeper in an item taxonomy than a category. For example, an item taxonomy for Shamrock Farms whole milk can comprise a super department of "Eggs and Dairy," a department of "Milk," a category of "Dairy Milk," and a sub-category of "Whole Milk." As another non-limiting example, an item taxonomy for a sofa can comprise a super department of "Home," a department of "Furniture and Appliances," a category of "Living Room," and a sub-category of "Sofas and Sectionals." In both examples described above, the item taxonomy can be further segmented into brand/manufacturer if needed. In many embodiments, an item taxonomy can be received from a computer administered from or by system 300 (FIG.

3). In these or other embodiments, an item taxonomy can be received from a third party system or vendor. In some embodiments, the data stored in the cataloging engine 352 can include product types that are associated with a product item in error. In some embodiments, the errors correspond to product types for the product items which can cause a non-compliant item to be displayed to the user 340 via the GUI 351. Accordingly, the analysis system 310 mitigates the cataloging engine 352 from displaying non-compliant material to the user 340.

In many embodiments, the techniques described herein can provide a practical application and several technological improvements. In some embodiments, the techniques described herein can provide for the mitigation of displaying non-compliant material by removing incorrectly tagged items (e.g., items with in incorrect product type) from being displayed on a GUI. These techniques described herein can provide a significant improvement over conventional approaches of rectifying tagging errors. In many embodiments, the techniques described herein can beneficially make determinations of product type and correct product tagging errors. In this way, the techniques described herein can avoid problems with stale and/or outdated machine learned models by continually updating product type groupings on an individual level without requiring an entire system update.

In a number of embodiments, the techniques described herein can advantageously provide an improvement in the user experience by mitigating the display of non-compliant information and provide a user with result corresponding to their search. In various embodiments, the techniques described herein can dynamically remove non-compliant material in real time, as described in further detail below. This, in turn, can update GUI's to remove the non-compliant material and improve operation of the computing system.

In many embodiments, the techniques described herein can be used continuously at a scale that cannot be reasonably performed using manual techniques or the human mind. For example, processing millions of product types within milliseconds cannot be feasibly completed by a human In a number of embodiments, the techniques described herein can solve a technical problem that arises only within the realm of computer networks, as online orders do not exist outside the realm of computer networks.

In many embodiments, the techniques described herein can solve a technical problem in a related field that cannot be solved outside the context of computer networks. Specifically, the techniques described herein cannot be used outside the context of computer networks due to a lack of data and because the machine learning model cannot be performed without a computer system and/or network.

Figure 4:
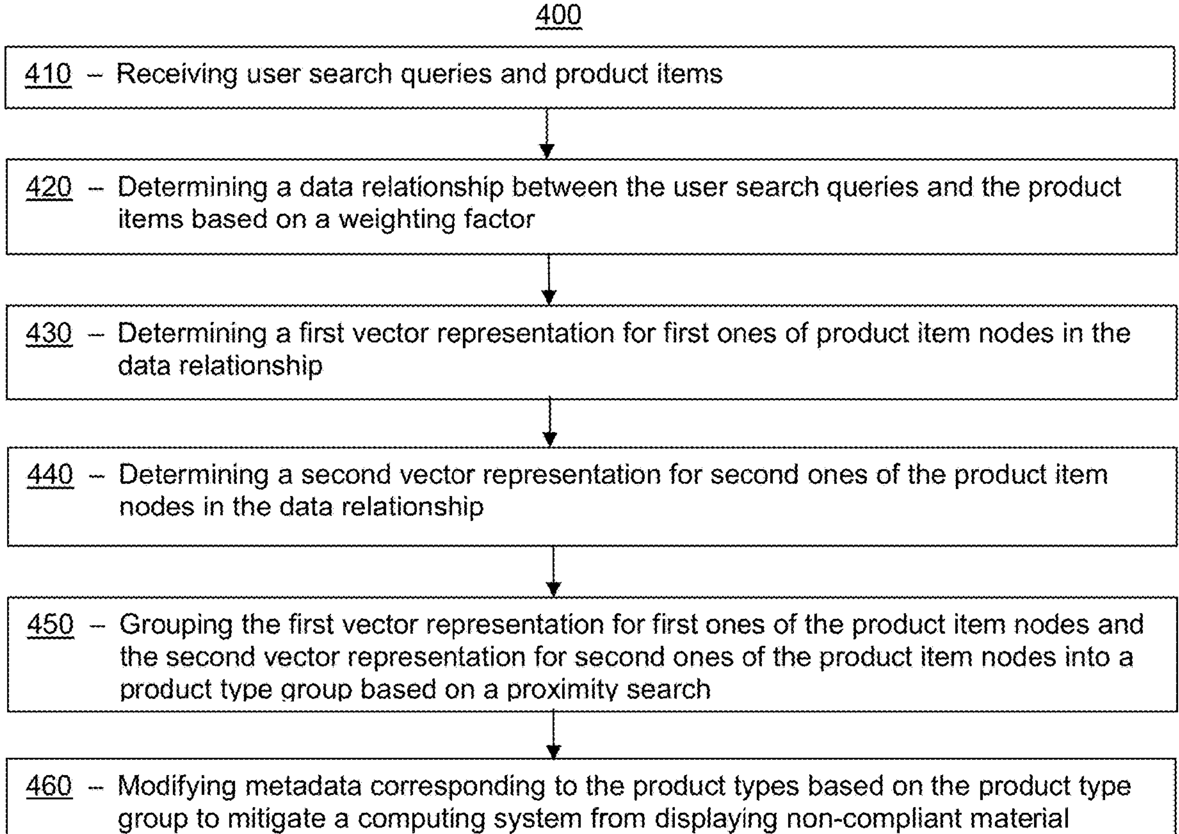
FIG. 4 illustrates a flowchart for a method, according to certain embodiments.
Figure 8:
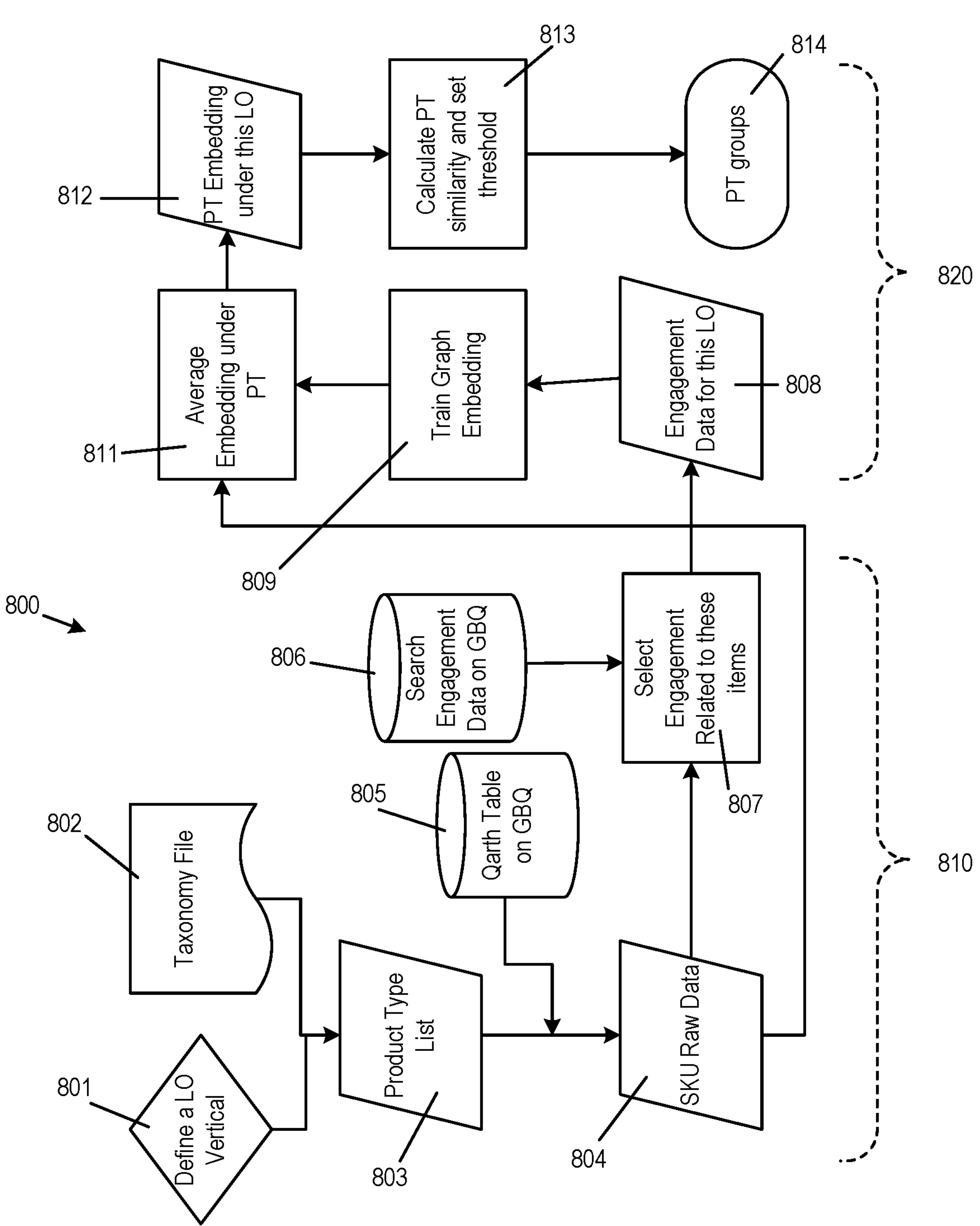
FIG. 8 illustrates a flowchart of a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as analysis system 310, web server 320, and/or user device 340 (FIG. 3). The processing module(s) can be similar or identical to the processing module(s) described above with respect to computer system 100 (FIG. 1). In some embodiments, method 400 can be performed in parallel, before, after, or as a part of method 800 (FIG. 8). In various embodiments, one or more activities of method 800 can be inserted into and/or combined with all of or portions of method 400 (FIG. 4).

In many embodiments, method 400 can comprise an activity 410 of receiving user search queries and product items. In some embodiments, the product items include metadata corresponding to product types. For example, the product types can correspond to a product type for "t-shirt," "sweatshirt," "pants," etc.

In some embodiments, receiving the product items comprises receiving the product items from a cataloging engine. In some embodiments, the product types include errors from the cataloging engine 352 and the errors correspond to one or more of the product items including a non-compliant product type. For example, the cataloging engine 352 can include a non-compliant product type for "t-shirt" associated with a product for a "dress." In the same or different embodiments, the product items from the cataloging engine 352 can comprise levels of an item taxonomy. In many embodiments, an item taxonomy can be configured to classify a catalogue of items based on properties of each item of the catalogue of items. In the same or different embodiments, properties of an item can comprise a title, a description, a price, a brand, a manufacturer, a color, a quantity, a volume, a weight, a material, a style, a pattern, a theme, a recommended use, a color, a fabric, etc. In some embodiments, an item taxonomy can comprise distinct levels of item classification. In further embodiments, distinct levels of item classification can narrow as the distinct levels go deeper into an item taxonomy. In various embodiments, distinct levels of item classification can comprise a super department, a department, a category, and/or a sub-category. In many embodiments, a department can be deeper in an item taxonomy than a super department. In the same or different embodiments, a category can be deeper in an item taxonomy than a department. In some embodiments, a sub-category can be deeper in an item taxonomy than a category. For example, an item taxonomy for Shamrock Farms whole milk can comprise a super department of "Eggs and Dairy," a department of "Milk," a category of "Dairy Milk," and a sub-category of "Whole Milk." As another non-limiting example, an item taxonomy for a sofa can comprise a super department of "Home," a department of "Furniture and Appliances," a category of "Living Room," and a sub-category of "Sofas and Sectionals." In both examples described above, the item taxonomy can be further segmented into brand/manufacturer if needed. In many embodiments, an item taxonomy can be received from a computer administered from or by system 300 (FIG. 3). In these or other embodiments, an item taxonomy can be received from a third party system or vendor.

Figure 5:
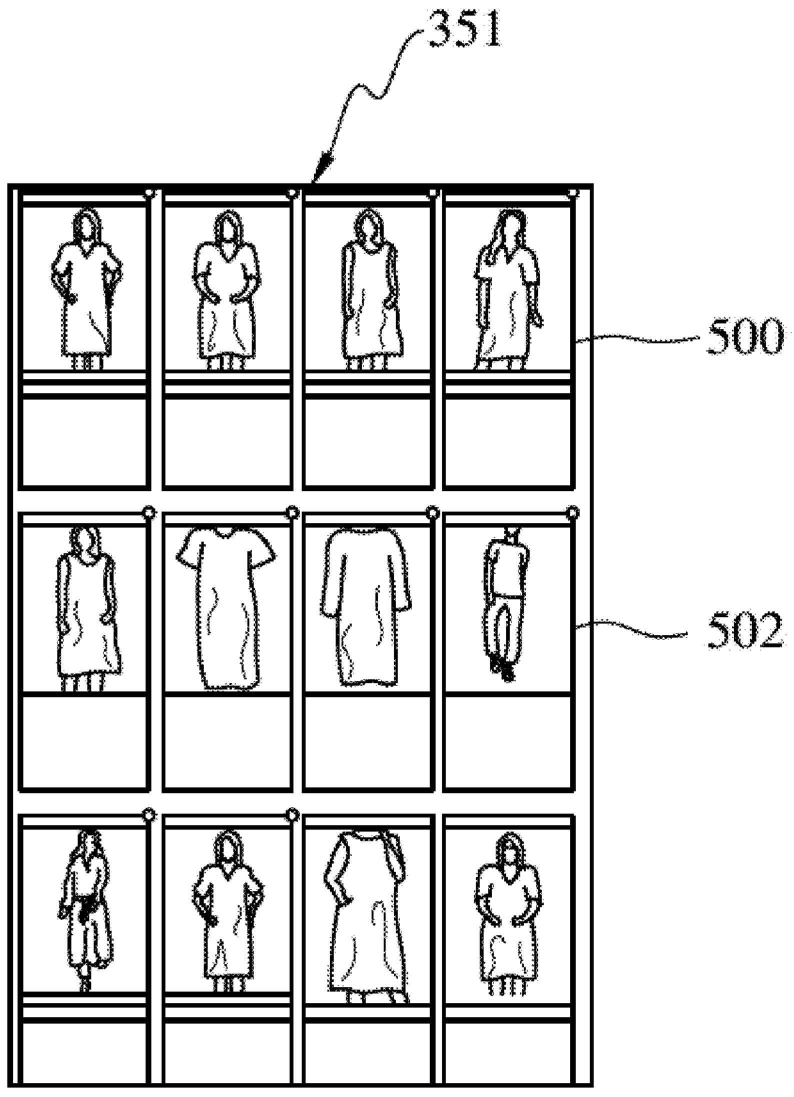
FIG. 5 illustrates an exemplary graphical user interface according to certain embodiments.

Turning briefly to FIG. 5, an interface of the GUI 351 is illustrated including compliant material 500 and non-compliant material 502. In the illustrated embodiment, the user 350 input a search query for "dress" and the cataloging engine 352 returned a number of products to display based on the products metadata (e.g., product types). In the illustrated embodiment, the non-compliant material 502 was displayed because the product for "t-shirt" was tagged with a product type for "dress" in error.

Returning to FIG. 4, in some embodiments, the method 400 can include an activity 420 of determining a data relationship between the user search queries and the product items based on a weighting factor. In some embodiments, the data relationship can include user search query nodes and product item nodes.

In some embodiments, the weighting factor is based on user interaction information. In some embodiments, the user interaction information can include one or more of: product items selected by a user, product items added-to-cart by a user, and product items purchased by a user. That is, a product with more user interaction information for a certain search query will have a higher weight than a product with less user interaction information.

In some embodiments, determining the data relationship comprises linking the user search query nodes and the product item nodes in a bipartite graph based on the user interaction information.

In some embodiments, linking the user search query nodes and the product item nodes in the bipartite graph is further based on i) identifying a user search query node of the user search query nodes, and ii) linking one or more of the product item nodes to the user search query node based on a user interaction with the one or more of the product item nodes during a user session associated with a user search query corresponding to the user search query node.

Figure 6:
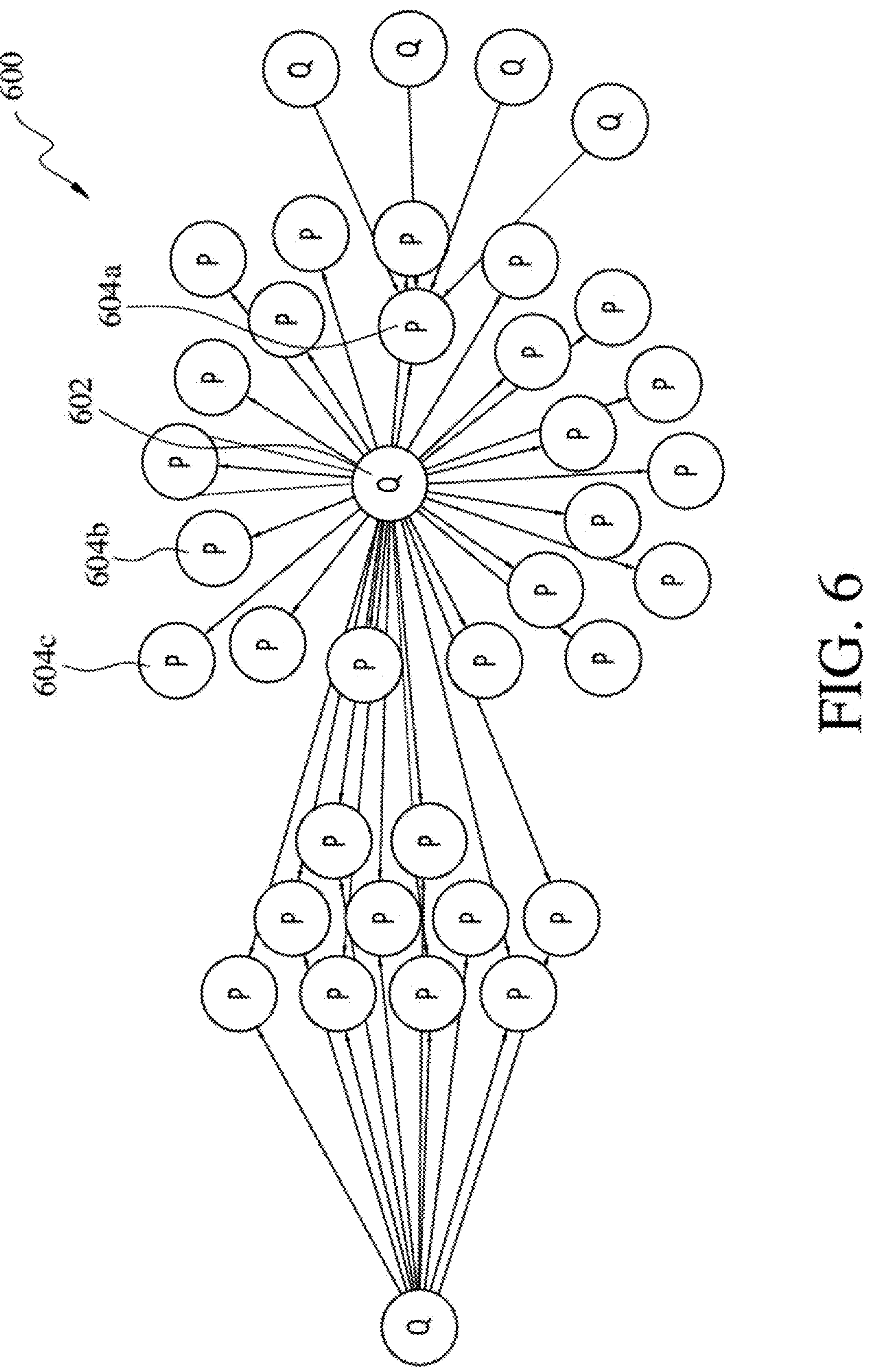
FIG. 6 illustrates an exemplary data relationship, according to certain embodiments.

Turning briefly to FIG. 6, an exemplary data relationship 600 is illustrated. In the illustrated embodiment, the data relationship 600 is a bipartite graph including a user search query node 602 and item product nodes 604*a-c*. In the illustrated embodiment, the user search query node 602 has been linked with the product item nodes 602*a-c* based on user interaction information associated with product items selected by the user 350 (e.g., clicks). In the illustrated embodiment, product node 602*a* has a higher amount of clicks than product nodes 602*b-c*. In this embodiment, the product node 602*a* has a higher weight than the product nodes 602*b-c* and is closer to the user search query mode 602 in the data relationship 600.

Returning to FIG. 4, in some embodiments, the method 400 can include an activity 430 of determining a first vector representation for first ones of the product item nodes in the data relationship. In some embodiments, determining the first vector representation comprises: i) identifying a user search query node of the user search query nodes, ii) determining a vector representation of product item nodes in the graph by vector generation, and iii) determining a centroid node of product item nodes with a same product type to represent product type. In some embodiments, the first vector representation of the centroid node is determined by averaging the vector representation of all product item nodes with the same product type.

In some embodiments, the method 400 can include an activity 440 of determining a second vector representation for second ones of the product item nodes in the data relationship. In some embodiments, determining the second vector representation comprises: i) identifying a user search query node of the user search query nodes, ii) determining a vector representation of product item nodes in the graph by vector generation, and iii) determining a centroid node of product item nodes with a same product type to represent product type. In some embodiments, the second vector representation of the centroid node is determined by averaging the vector representation of all product item nodes with the same product type.

In some embodiments, the method 400 can include an activity 450 of grouping the first vector representation for first ones of the product item nodes and the second vector representation for second ones of the product item nodes into a product type group based on a proximity search. In some embodiments, the proximity search is at least one of a k-nearest neighbor search, or a cosine similarity search. In some embodiments, the proximity search can be performed in the data relationship 600. For example, the first ones of the product item nodes can be the product node 602*a* and the second ones of the product item nodes can be the product nodes 602*b-c*. In some embodiments, grouping the first vector representation for the first ones of the product item nodes and the second vector representation for the second ones of the product item nodes into the product type group comprises grouping the first vector representation and the second vector representation that are within a threshold cosine similarity. In some embodiments, the product nodes 602*a-c* can be grouped in a product type associated with "dress."

In some embodiments, the method of 400 can include an activity 460 of modifying the metadata corresponding to the product types based on the product type group to mitigate a computing system from displaying non-compliant material to a user.

In some embodiments, modifying the metadata corresponding to the product type based on the product type group comprises: i) identifying a product item from the product items, the product item including metadata corresponding to a first product type of the product types, ii) verifying the first product type based on the product type group, and iii) modifying the metadata to replace the first product type from the product item with the product type group. In some embodiments, the product item for "t-shirt" may include a first product type for "dress." In some embodiments, when a user enters a query for "dress" the product item for "t-shirt" will be provided because of the product type for "dress," as shown in interface 351 of FIG. 5 displaying non-compliant material 502. In some embodiments, the product type for "dress" is removed and/or replaced from the metadata with the determined product type group, as detailed above. As such, the product item for "t-shirt" no longer includes the product type for "dress." In some embodiments, replacing the product type group for the product item comprises removing the product item from being displayed in response to a search query that corresponds to the original product type.

Figure 7:
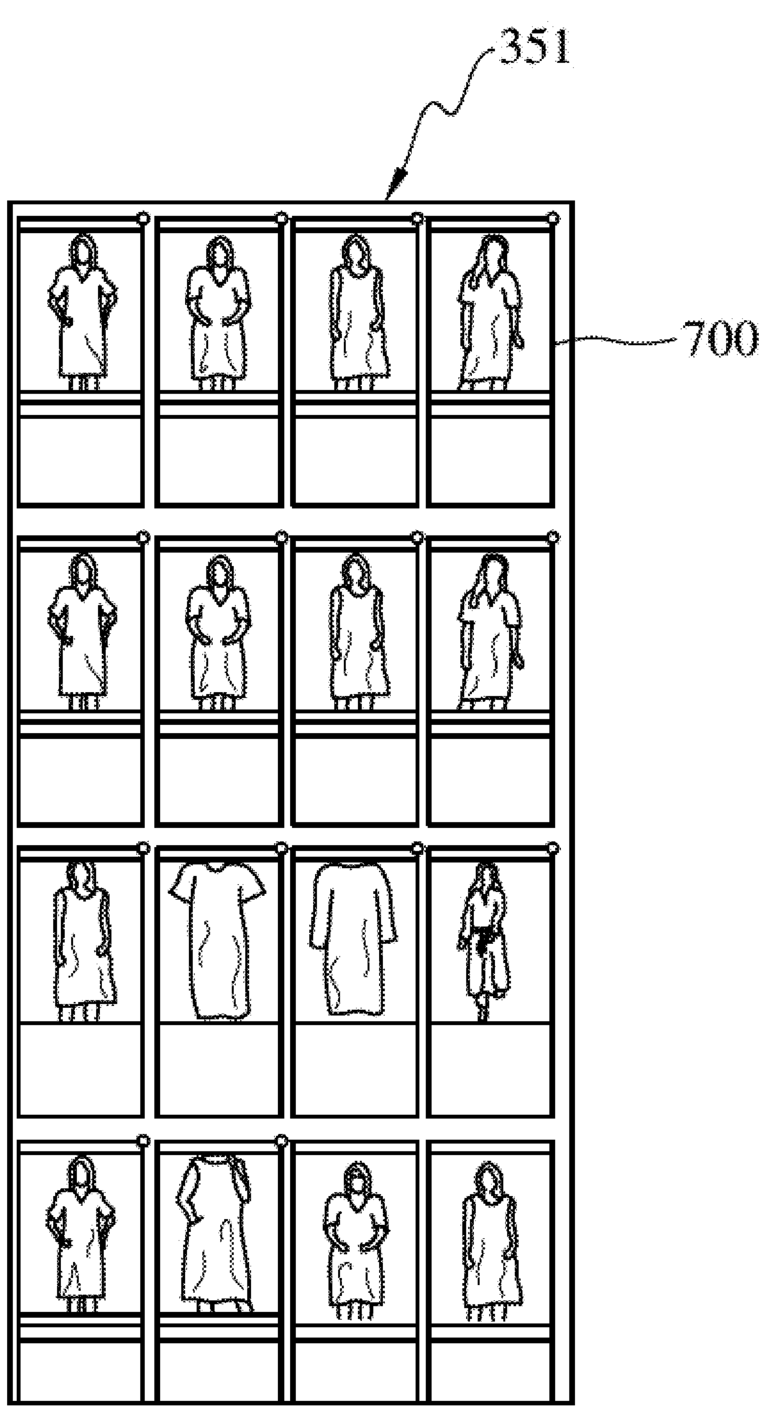
FIG. 7 illustrates an alternative graphical user interface, according to certain embodiments.

Turning briefly to FIG. 7, an interface of the GUI 351 is illustrated including compliant material 700. In contrasts to the interface of the GUI 351 in FIG. 5, the interface no longer displays the non-compliant material 502. In the illustrated embodiment, the user 350 input a search query for "dress" and the analysis system 310 returned a number of products to display based on the product types. In the illustrated embodiment, the non-compliant material 502 is not displayed because the product for "t-shirt" no longer includes the product type for "dress" based on the determination of a product type, as detailed above.

Turning ahead in the drawings, FIG. 8 illustrates a method 800, according to an embodiment. Method 800 is merely exemplary and is not limited to the embodiments presented herein. Method 800 can be employed in many different embodiments or examples not specifically depicted or described herein. In some embodiments, the activities of method 800 can be performed in the order presented. In other embodiments, the activities of method 800 can be performed in any suitable order. In still other embodiments, one or more of the activities of method 800 can be combined or skipped. In many embodiments, system 300 (FIG. 3) can be suitable to perform method 800 and/or one or more of the activities of method 800. In these or other embodiments, one or more of the activities of method 800 can be implemented as one or more computer instructions configured to run at one or more processing modules and configured to be stored at one or more non-transitory memory storage modules. Such non-transitory memory storage modules can be part of a computer system such as analysis system 310, web server 320, and/or user device 340 (FIG. 3). The processing module(s) can be similar or identical to the processing module(s) described above with respect to computer system 100 (FIG. 1). In some embodiments, method 800 can be performed in parallel, before, after, or as a part of method 400 (FIG. 4). In various embodiments, one or more activities of method 800 can be inserted into and/or combined with all of or portions of method 400 (FIG. 4).

In many embodiments, method 800 can comprise an activity 810 of obtaining product type embedding information. In some embodiments, obtaining product type embedding information includes defining a L0 vertical. In some embodiments, defining an L0 vertical comprises defining a product that a product type group is to be determined for. For example, defining a L0 vertical comprises selecting "dresses" as a L0 vertical. In some embodiments, the product type embedding information comprises a taxonomy file 802, a product type list 803, stock-keeping unit (SKU) raw data 804, Qarth table 805, and search engagement data 806. In some embodiments, the activity 810 includes a step 807 of selecting an engagement related to these items. In some embodiments, selecting the engagement comprises selecting user interactions associated with a product (e.g., "dresses," "bedding," etc.) corresponding to the L0 vertical 808.

In some embodiments, the method 800 can comprise an activity 820 of determining a product type embedding. In some embodiments, determining a product type embedding can comprise training graph embedding 809. In some embodiments, training graph embedding 809 can comprise one or more of activities 410-450 of method 400. In some embodiments, training graph embedding 809 can include performing one or more algorithms, such as, Node2Vec, Network Graph, Random Walk, and/or Skip-gram. In some embodiments, determining a product type embedding can comprise determining an average embedding under the product type 811. In some embodiments, determining the average embedding under product type 811 can comprise one or more of activities 430-450 of method 400. In some embodiments, activity 820 can include determining a product type embedding under this L0 812, and calculating a product type similarity and set threshold 813. In some embodiments, steps 812 and 813 can comprise one or more of activities 440-450 of method 400. In some embodiments, any products that are determined to be within the product type similarity and threshold will be tagged with the product type group for that L0, as in step 814.

In some embodiments, an operation of method 800 can include an L0 vertical for "dresses." In some embodiments, the method 800 can include identifying the product type embedding information for "dresses." For example, products that have a product type of "dresses" in the taxonomy are identified and their corresponding engagement data is obtained. In some embodiments, a user search query for "dresses" is identified as a user search query node in a bipartite graph and corresponding products that were selected by a user are linked to the user search query node as product item nodes in the bipartite graph. In some embodiments, product item nodes that have more engagement with the user search query node ("dresses") are closer to the user search query node in the bipartite graph. In some embodiments, when the engagement data has been analyzed and the graph embedding has been established, a cosine similarity score can be set for the product type "dresses." In the bipartite graph, a user search query node for "summer dresses" can be determined to have a cosine similarity score that is within a threshold of the "dresses" similarity score. Accordingly, the "dresses" and "summer dresses" can be grouped into a product type group (e.g., step 814).

Figure 9:
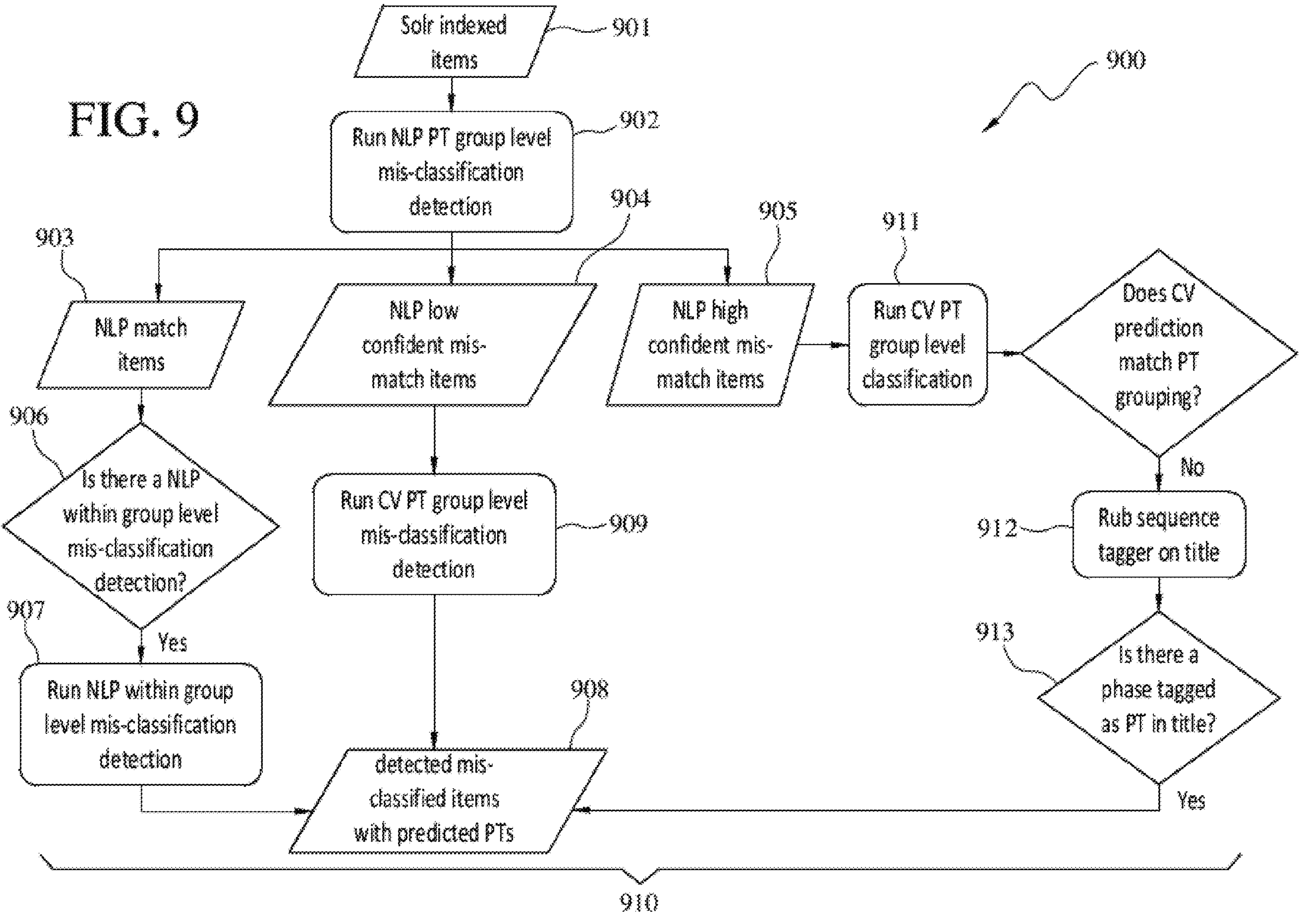
FIG. 9 illustrates a flowchart of a method, according to certain embodiments.

Turning ahead in the drawings, FIG. 9 illustrates a method 900, according to an embodiment. Method 900 is merely exemplary and is not limited to the embodiments presented herein. Method 900 can be employed in many different embodiments or examples not specifically depicted or described herein. In some embodiments, the activities of method 900 can be performed in the order presented. In other embodiments, the activities of method 900 can be performed in any suitable order. In still other embodiments, one or more of the activities of method 900 can be combined or skipped. In many embodiments, system 300 (FIG. 3) can be suitable to perform method 900 and/or one or more of the activities of method 900. In these or other embodiments, one or more of the activities of method 900 can be implemented as one or more computer instructions configured to run at one or more processing modules and configured to be stored at one or more non-transitory memory storage modules. Such non-transitory memory storage modules can be part of a computer system such as analysis system 310, web server 320, and/or user device 340 (FIG. 3). The processing module(s) can be similar or identical to the processing module(s) described above with respect to computer system 100 (FIG. 1). In some embodiments, method 900 can be performed in parallel, before, after, or as a part of method 400 (FIG. 4) and/or method 800 (FIG. 8). In various embodiments, one or more activities of method 900 can be inserted into and/or combined with all of or portions of method 400 (FIG. 4) and/or method 800 (FIG. 8).

In many embodiments, method 900 can comprise an activity 910 of determining a mis-classification of product type within a product type group. In some embodiments, the product type group includes product type sub-groups that are within the product type group. For example, a product type group A (e.g., "bedding") can exist with product type sub-group A1 ("mattress pads"), product type sub-group A2 ("mattress toppers"), etc. that correspond to sub-groups within the group. In some embodiments, determining a mis-classification can comprise obtaining indexed information from the cataloging engine 901, where the cataloging engine can be similar to cataloging engine 352 (FIG. 3), and performing a natural language processing mis-classification detection process 902. In some embodiments, performing a natural language processing mis-classification detection process 902 can comprise analyzing title and brand associated with a product from the indexed information. In some embodiments, if the title and brand are determined to correspond to the product type, an NLP match 903 will be determined; if the title and/or brand have a low confident of being mis-matched (e.g., title does not match product type, but brand does), an NLP low confident mis-match item 904 will be determined; and if the title and brand are not associated with the product type, an NLP high confident mis-match item 905 will be determined. If an NLP match item 903 is determined, a determination is made on whether there is a NLP within group level mis-classification detection 906. In some embodiments, the NLP within group level mis-classification corresponds to determining if there is a product type sub-group mis-classification. If there is no sub-group level-mis-classification, the method 900 ends. If there is a sub-group-level mis-classification detection 906, NLP within group (e.g., sub-group) level mis-classification detection is performed 907 and any mis-classified items are given a prediction of what product type they belong to 908. For example, a prediction that the product corresponds to a "dresses" product type. In some embodiments, NLP low confident mis-match items 904 have a computer vision product type group level mis-classification detection 909 performed on the images for the products and any mis-classified items are given a prediction of what product type they belong to 908. In some embodiments, NLP high confident mis-match items 905 have a computer vision product type group level mis-classification detection 911 performed on the images for the products. In some embodiments, if the computer vision prediction matches the product type group, the method 900 ends. If the computer vision prediction does not match the product type group, a sequence tagger is run on the title 912 to remove any products without product type tags in the title. In some embodiments, if there is a phrase tagged as product type in the title 913, any mis-classified items are given a prediction of what product type group they belong to 908. In some embodiments, any mis-classified items that have add-to-cart rates above a threshold will remain as correctly classified. That is, a product that has been mis-classified with an add-to-cart rate above the threshold will be identified as classified and not mis-classified. In some embodiments, the predicted product types are utilized by the system to display products to the user 340 via the GUI 351.

Figure 10:
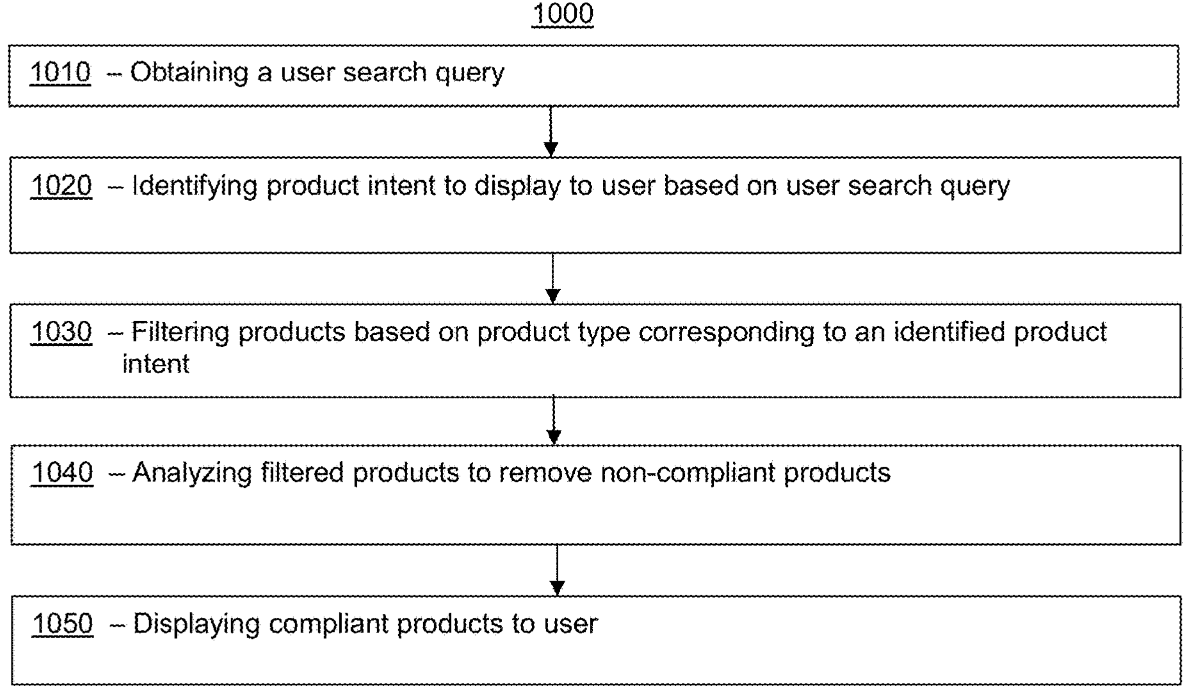
FIG. 10 illustrates a flowchart of a method, according to certain embodiments.

Turning ahead in the drawings, FIG. 10 illustrates a method 1000, according to an embodiment. Method 1000 is merely exemplary and is not limited to the embodiments presented herein. Method 1000 can be employed in many different embodiments or examples not specifically depicted or described herein. In some embodiments, the activities of method 1000 can be performed in the order presented. In other embodiments, the activities of method 1000 can be performed in any suitable order. In still other embodiments, one or more of the activities of method 1000 can be combined or skipped. In many embodiments, system 300 (FIG. 3) can be suitable to perform method 1000 and/or one or more of the activities of method 1000. In these or other embodiments, one or more of the activities of method 1000 can be implemented as one or more computer instructions configured to run at one or more processing modules and configured to be stored at one or more non-transitory memory storage modules. Such non-transitory memory storage modules can be part of a computer system such as analysis system 310, web server 320, and/or user device 340 (FIG. 3). The processing module(s) can be similar or identical to the processing module(s) described above with respect to computer system 100 (FIG. 1). In some embodiments, method 1000 can be performed in parallel, before, after, or as a part of method 400 (FIG. 4), method 800 (FIG. 8), and/or method 900 (FIG. 9). In various embodiments, one or more activities of method 1000 can be inserted into and/or combined with all of or portions of method 400 (FIG. 4), method 800 (FIG. 8), and/or method 900 (FIG. 9).

In some embodiments, the method 1000 can comprise an activity 1010 of obtaining a user search query. In some embodiments, the user 350 can interact with the user device 340 and the GUI 351 to input a search query (e.g., "dresses," "pants," etc.) into a web browser to search for a particular item.

In some embodiments, the method 1000 can comprise an activity 1020 of identifying product intent to display to user based on user search query. In some embodiments, identifying product intent comprises identifying product types of products that are intended to be displayed to the user based on the user search query. For example, a user search query for "dress" can result in a product intent of all products with a product type for "dress," "gown," etc.

In some embodiments, the method 1000 can comprise an activity 1030 of filtering products based on product type corresponding to an identified product intent. In some embodiments, filtering products includes removing products that do not correspond to the product intent and/or do not include a product type that corresponds to the product intent of the user search query.

In some embodiments, the method 1000 can comprise an activity 1040 of analyzing the filtered products to remove non-compliant products. In some embodiments, the activity 1040 is executed to remove non-compliant material. In some embodiments, products may remain and be displayed to the user if: i) the product has not been mis-classified, ii) the products are mis-classified and have add-to-cart rate higher than predefined threshold, or iii) the products are mis-classified and the products predicted product type belongs to the product intent, as detailed above in connection with activity 910 of FIG. 9.

In some embodiments, the method 1000 can comprise an activity 1050 of displaying the compliant products to the user. In some embodiments, displaying the compliant products comprises removing the non-compliant products and displaying the compliant products, such as in displaying the compliant material 700 in GUI 351 without the non-compliant material 502 in FIG. 7. In some embodiments, the activities 1030-1050 can include the activity 910 of determining a mis-classification of product type within a product type group, as detailed above in connection with FIG. 9.

Returning to FIG. 3, in several embodiments, communication system 311 can at least partially perform activity 410 (FIG. 4), activity 810 (FIG. 8), and/or activity 1010 (FIG. 10).

In several embodiments, relationship system 312 can at least partially perform activity 420 (FIG. 4), activity 820 (FIG. 8), activity 910 (FIG. 9), and/or activity 1020 (FIG. 10).

In a number of embodiments, evaluation system 313 can at least partially perform activities 430-450 (FIG. 4), activity 820 (FIG. 8), activity 910 (FIG. 9), and/or activities 1020-1030 (FIG. 10).

In several embodiments, auditing system 314 can at least partially perform activity 450 (FIG. 4) activity 820 (FIG. 8), activity 910 (FIG. 9), and/or activities 1040-1050 (FIG. 10).

In a number of embodiments, web server 320 can at least partially perform method 400, method 800, method 900 and/or method 1000.

Although systems and methods for mitigating display of non-compliant information have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-10 may be modified, and that the foregoing discussion of certain of these embodiments does not necessarily represent a complete description of all possible embodiments. For example, one or more of the procedures, processes, or activities of FIGS. 4 and 8-10 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

a processor; and a non-transitory computer-readable medium storing computing instructions that, when executed on the processor, perform:

forming a product type group based on vector representations, of product items, generated using a graph embedding model that is trained on user search query nodes and product item nodes corresponding to user search queries and the product items, the product items including metadata corresponding to product types, the product types comprising an error, and the error corresponding to one of the product items having a non-compliant product type;

modifying the metadata corresponding to the product types based on the product type group to mitigate a computing system from displaying non-compliant material to a user; and in response to a product type of the product type group being the non-compliant product type, performing a computer vision misclassification detection on an image of a product corresponding to the product type and assigning a predicted product type to the product based on the computer vision misclassification detection.

2. The system of claim 1, further comprising:

determining a data relationship between the user search queries and the product items based on a weighting factor, the data relationship including the user search query nodes and the product item nodes.

3. The system of claim 2, wherein forming the product type group comprises:

determining a first vector representation for first ones of the product item nodes in the data relationship;

determining a second vector representation for second ones of the product item nodes in the data relationship, the vector representations including the first vector representation and the second vector representation; and grouping the first vector representation and the second vector representation into the product type group based on a proximity search.

4. The system of claim 3, wherein the proximity search includes at least one of a nearest neighbor search or a cosine similarity search.

5. The system of claim 3, wherein grouping the first vector representation and the second vector representation into the product type group comprises grouping the first vector representation and the second vector representation that are within a threshold of a cosine similarity.

6. The system of claim 3, wherein determining the first vector representation comprises:

identifying a user search query node of the user search query nodes;

determining a vector representation of the product item nodes in a bipartite graph by vector generation;

determining a centroid node of the product item nodes with a same product type to represent the product type; and determining the first vector representation based on the centroid node by averaging the vector representation and one or more other vector representations with the same product type.

7. The system of claim 2, wherein the weighting factor is based on user interaction information, and wherein the user interaction information comprises information regarding at least one of: product items selected by the user, product items added-to-cart by the user, or product items purchased by the user.

8. The system of claim 2, wherein determining the data relationship comprises linking the user search query nodes and the product item nodes in a bipartite graph based on user interaction information.

9. The system of claim 8, wherein linking the user search query nodes and the product item nodes in the bipartite graph is based on:

identifying a user search query node of the user search query nodes; and linking at least one of the product item nodes to the user search query node based on a user interaction with at least one of the product item nodes during a user session associated with a user search query, of the user search queries, corresponding to the user search query node.

10. The system of claim 1, wherein modifying the metadata corresponding to the product types based on the product type group comprises:

identifying a product item from the product items, the product item corresponding to a first product type of the product types;

verifying the first product type based on the product type group; and modifying the metadata corresponding to the product types by replacing the first product type from the product item with the product type group.

11. The system of claim 10, wherein replacing the first product type from the product item with the product type group comprises removing the product item from being displayed in response to a search query that corresponds to the first product type.

12. A computer-implemented method, the computer-implemented method comprising:

forming a product type group based on vector representations, of product items, generated using a graph embedding model that is trained on user search query nodes and product item nodes corresponding to user search queries and product items, the product items including metadata corresponding to product types, the product types comprising an error, and the error corresponding to one of the product items having a non-compliant product type;

modifying the metadata corresponding to the product types based on the product type group to mitigate a computing system from displaying non-compliant material to a user; and in response to a product type of the product type group being the non-compliant product type, performing a computer vision misclassification detection on an image of a product corresponding to the product type and assigning a predicted product type to the product based on the computer vision misclassification detection.

13. The computer-implemented method of claim 12, further comprising:

determining a first vector representation for first ones of the product item nodes, the vector representations including the first vector representation.

14. The computer-implemented method of claim 13, further comprising:

determining a second vector representation for second ones of the product item nodes, wherein the vector representations further include the second vector representation, and wherein forming the product type group comprises:

grouping the first vector representation and the second vector representation into the product type group based on a proximity search.

15. The computer-implemented method of claim 14, wherein the proximity search includes at least one of a k-nearest neighbor search or a cosine similarity search.

16. The computer-implemented method of claim 13, wherein determining the first vector representation comprises:

identifying a user search query node of the user search query nodes;

determining a vector representation of the product item nodes in a bipartite graph by vector generation;

determining a centroid node of the product item nodes with a same product type to represent the product type; and determining the first vector representation based on the centroid node by averaging the vector representation and one or more other vector representations with the same product type.

17. The computer-implemented method of claim 12, wherein the vector representations are based on information regarding at least one of: product items selected by the user, product items added-to-cart by the user, or product items purchased by the user.

18. The computer-implemented method of claim 12, further comprising:

linking the user search query nodes and the product item nodes in a bipartite graph based on user interaction information.

19. The computer-implemented method of claim 18, wherein linking the user search query nodes and the product item nodes in the bipartite graph is based on:

identifying a user search query node of the user search query nodes; and linking at least one of the product item nodes to the user search query node based on a user interaction with the at least one of the product item nodes during a user session associated with a user search query, of the user search queries, corresponding to the user search query node.

20. A non-transitory computer-readable medium storing instructions for data management, the instructions, upon execution by processors of a computing system, cause the computing system to perform at least one process including:

forming a product type group based on vector representations, of product items, generated using a graph embedding model that is trained on user search query nodes and product item nodes corresponding to user search queries and product items, the product items including metadata corresponding to product types, the product types comprising an error, and the error corresponding to one of the product items having a non-compliant product type;

modifying the metadata corresponding to the product types based on the product type group to mitigate a computing system from displaying non-compliant material to a user; and in response to a product type of the product type group being the non-compliant product type, performing a computer vision misclassification detection on an image of a product corresponding to the product type, and assigning a predicted product type to the product based on the computer vision misclassification detection.

* * * * *